3,037,967
POLYMERS OF DIMERCAPTOBICYCLO-
[2.2.1] HEPTANES AND SULFUR
Rector P. Louthan, Bartlesville, Okla., assignor to Phillips Petroleum Company, a corporation of Delaware
No Drawing. Filed Mar. 31, 1959, Ser. No. 803,079
5 Claims. (Cl. 260—79)

This invention relates to polymers of 2,5-dimercaptobicyclo[2.2.1]heptane and 2,6-dimercaptobicyclo[2.2.1]heptane. In an aspect of the invention it relates to polymers as stated, obtained by the reaction of at least one of 2,5-, and 2,6-dimercaptobicyclo[2.2.1]heptanes with sulfur in the presence of an amine catalyst. In another of its aspects, the invention relates to the resulting new polymers which are compositions of matter useful for the preparation of films and for fabrication of molded objects.

In copending application Serial Number 802,030, filed March 26, 1959, by John E. Mahan and by me there are described and claimed the dithiols which form the starting materials of the present invention. Also claimed in said copending application is a method for preparing said dithiols.

I have found that moldable, yet brittle, polymer having a pleasing golden color can be obtained by the reaction of at least one of the foregoing dithiols with sulfur in the presence of an amine catalyst, as more fully described herein.

It is an object of this invention to prepare a novel polymer. It is a further object of this invention to prepare a polymer of at least one of 2,5-, and 2,6-dimercaptobicyclo[2.2.1]heptane. It is a further object of this invention to provide novel polymers having certain properties or characteristics which render these particularly desirable for the molding of objects.

Other aspects, objects, and the several advantages of the invention are apparent from a study of the disclosure and the appended claims.

According to the present invention there is provided a sulfur-containing polymer which is prepared by a process which comprises the reaction of at least one of 2,5-, and 2,6-dimercaptobicyclo[2.2.1]heptane with sulfur in the presence of an amine catalyst.

The thiols which I employ have the structures

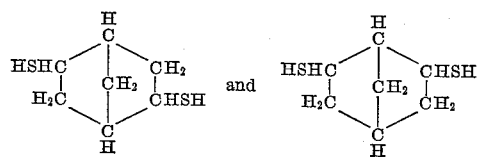

A mixture of these two dithiols is now employed since the isomers are readily prepared in admixture with each other.

To prepare the polymer, I mix the dithiols with 0.5 to 10 mols of sulfur per mol of dithiol. However, I generally prefer to use 0.75 to 2 mols of sulfur per mol of dithiol. The sulfur can be added as the solid, e.g., flowers of sulfur, or as a solution. Suitable solvents include chloroform, carbon tetrachloride, hexane, benzene, xylene, and toluene. The volume of solvent employed can be sufficient so that when the sulfur solution is mixed with the thiol, the volume ratio of solvent to thiol is at least as great as 10 to 1. Alternatively, a liquid diluent, such as the sulfur solvents listed above, can be mixed with the thiol prior to addition of the sulfur. The preferred diluents are the saturated aliphatic and aromatic hydrocarbons, such as listed above. When such diluents are employed, the reaction mixture preferably contains less than 10 volumes of the diluent for each volume of the thiol.

To effect reaction of the sulfur and dithiols, a catalyst is employed in an amount of about 0.01 to 3 percent by weight of the reactants. The catalysts now preferred comprise the tertiary aliphatic amines having 3–20 carbon atoms. Examples of these amines are illustrated by the following compounds:

Trimethylamine
Triethylamine
Triallylamine
Tri-n-butylamine
Tri-isobutylamine
Trihexylamine
Dihexyloctylamine
Dimethyl-n-octylamine and the like. Other amines which will catalyze the reaction can be employed. These include also the amine-ethylene oxide addition products. Particularly suitable addition products are illustrated by the following compounds:

Ethanolamine
Diethanolamine
Methyldiethanolamine
Diethylethanolamine
Triethanolamine In one embodiment of this invention, the amine catalyst is added slowly during the reaction period.

The reaction of the sulfur with the thiols in the presence of the catalyst is generally effected at temperatures of 0 to 200° C. and preferably at temperatures between 50 and 100° C. The reaction proceeds rapidly at the higher temperatures, and the reaction period need be only a few minutes, e.g., 3 to 15 minutes. At lower temperatures, e.g., 0 to 100° C., the reaction period is generally in the range of 0.5 to 50 hours.

The pressure at which the reaction is effected is sufficient to maintain the thiols substantially all in the liquid phase. The reaction is accompanied by the evolution of hydrogen sulfide. The hydrogen sulfide thus produced can be removed during the course of the reaction. When a low boiling diluent is employed, removal of the hydrogen sulfide is readily accomplished by effecting the reaction at a temperature and pressure so as to cause refluxing of the solvent. Refluxing of the solvent also permits control of the reaction temperature.

The reaction can be effected batchwise or continuously. The polymer can be recovered by any convenient means. In one method, the unreacted monomer together with solvent, if present, is removed by distillation at reduced pressures. The polymer can also be precipitated by addition of so-called poor solvents. These precipitants are illustrated by the following compounds:

Ethanol
Methanol
Isopropyl alcohol
Pentane
Hexane

The precipitated polymer can be recovered by filtration and dried.

The type of product which can be obtained depends, in part, on the mol ratio of sulfur to dithiol. Semi-solid and solid products are usually obtained when the sulfur to dithiol mol ratio is in the range of 2:1 to 6:1. For ratios less than 2:1 and down to about 0.5:1 liquid products are usually obtained.

The practice of this invention is illustrated by the following example.

Example

A mixture of the dithiols was prepared by the addition of hydrogen sulfide to bicyclo[2.2.1]hepta-2,5-diene. The dithiols (50 grams) were dissolved in 400 ml. of chloroform and mixed with 28.9 grams of flowers of sulfur. The mixture was heated to boiling to effect refluxing of the solvent. To the heated mixture there was added 100 cc. of chloroform containing 4 drops (about 0.2 cc.) of triethylamine. The amine was added slowly over a 10 minute period. During the addition of the amine there occurred a vigorous evolution of the hydrogen sulfide. The resulting solution was refluxed for six hours and then allowed to remain at room temperature over the weekend. The solution was poured into one liter of n-pentane whereupon the polymer precipitated. The polymer was recovered by filtration and dried in a vacuum oven at 100° C. for three hours. The polymer was a moldable, yet brittle, polymer having a pleasing golden color. The polymer was also transparent so that sheets of the polymer would have high utility for the fabrication of containers and various decorative articles.

The polymer is useful for the fabrication of containers as well as molding of decorative articles such as statuettes, book ends, etc.

A portion of the polymer described by this example was analyzed and found to contain 54 weight percent sulfur, as compared with a value of 40 percent sulfur for the dithiols.

Reasonable variation and modification are possible within the scope of the foregoing disclosure and the appended claims to the invention the essence of which is that there have been provided a moldable, transparent polymer and a method for preparing said polymer which essentially comprises heating a dithiol with sulfur while adding an amine and then providing time for the formation of the polymer.

I claim:

1. A moldable, yet brittle, polymer having a pleasing golden color derived by heating a solution of a dithiol selected from the group consisting of 2,5-dimercaptobicyclo[2.2.1]heptane and 2,6-dimercaptobicyclo[2.2.1]heptane with sulfur while adding an amine catalyst and obtaining evolutions of hydrogen sulfide and then providing time for completion of polymerization.

2. A process for the preparation of a polymer of a dithiol which comprises heating a compound selected from the group consisting of 2,5-dimercaptobicyclo[2.2.1]heptane and 2,6-dimercaptobicyclo[2.2.1]heptane with sulfur and an amine catalyst, obtaining an evolution of hydrogen sulfide and further heating and then allowing the reaction mass to remain at room temperature for a period of time to obtain a desired polymer.

3. A method for the preparation of a polymer which comprises dissolving 2,5-dimercaptobicyclo[2.2.1]heptane and 2,6-dimercaptobicyclo[2.2.1]heptane in a solvent, admixing flowers of sulfur with solution, heating the solution, adding a small amount of triethylamine catalyst to the solution, obtaining evolution of hydrogen sulfide, continuing heating for several hours, and then allowing the reaction mass to stand to complete the formation of the polymer, then precipitating the polymer by admixing the reaction mass with a liquid paraffinic hydrocarbon diluent, obtaining a polymer as a precipitate, and recovering said precipitate.

4. A process for the preparation of a polymer of a dithiol which comprises heating a compound selected from the group consisting of 2,5-dimercaptobicyclo[2.2.1]heptane and 2,6-dimercaptobicyclo[2.2.1]heptane with sulfur and a tertiary amine catalyst obtaining an evolution of hydrogen sulfide and further heating and then allowing the reaction mass to remain at room temperature for a period of time to obtain a desired polymer.

5. A process for the preparation of a polymer of a dithiol which comprises heating a compound selected from the group consisting of 2,5-dimercaptobicyclo[2.2.1]heptane and 2,6-dimercaptobicyclo[2.2.1]heptane with sulfur and an amine-ethylene oxide addition product catalyst, obtaining an evolution of hydrogen sulfide and further heating and then allowing the reaction mass to remain at room temperature for a period of time to obtain a desired polymer.

References Cited in the file of this patent

UNITED STATES PATENTS

| | | |
|---|---|---|
| 2,466,963 | Patrick et al. | Apr. 12, 1949 |
| 2,866,776 | Nummy | Dec. 30, 1958 |